Jan. 5, 1965 F. C. ARMISTEAD 3,164,720
RADIOACTIVITY BORE HOLE FLUID LOGGING
Filed April 2, 1962 5 Sheets-Sheet 5
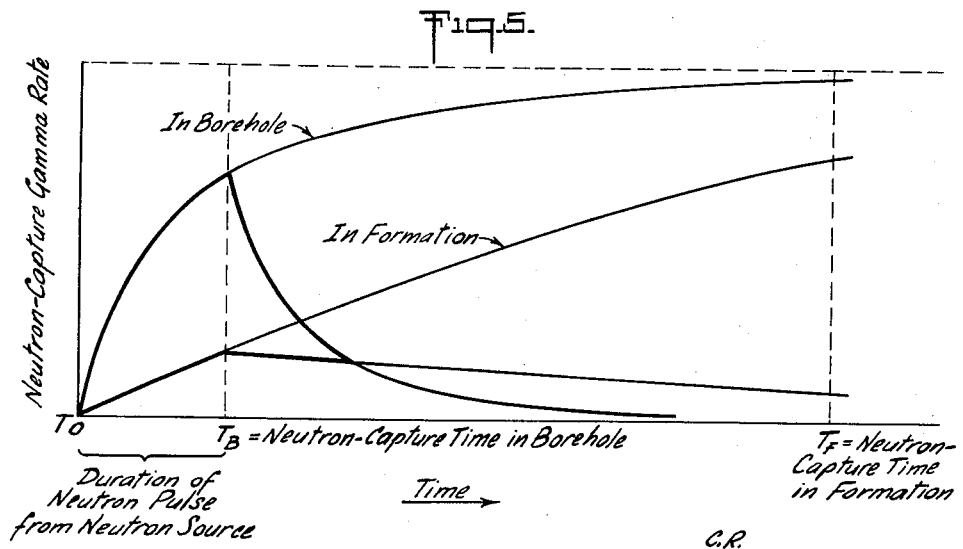
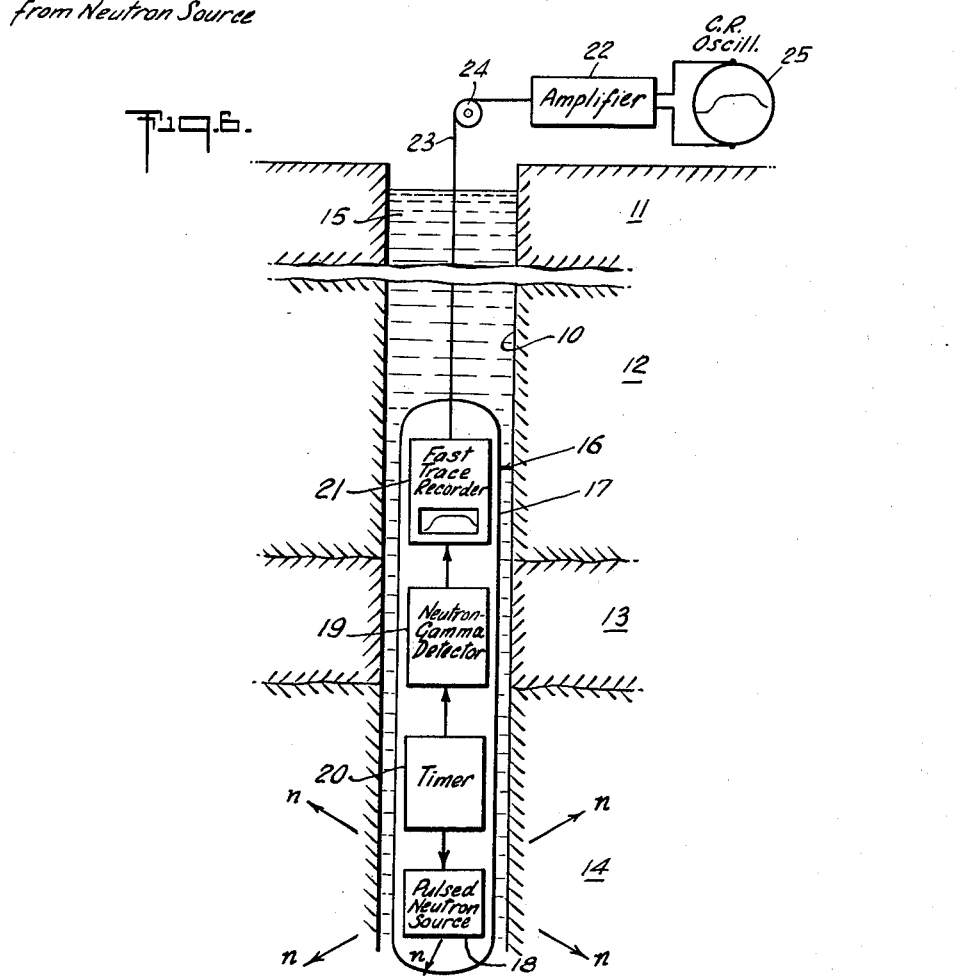

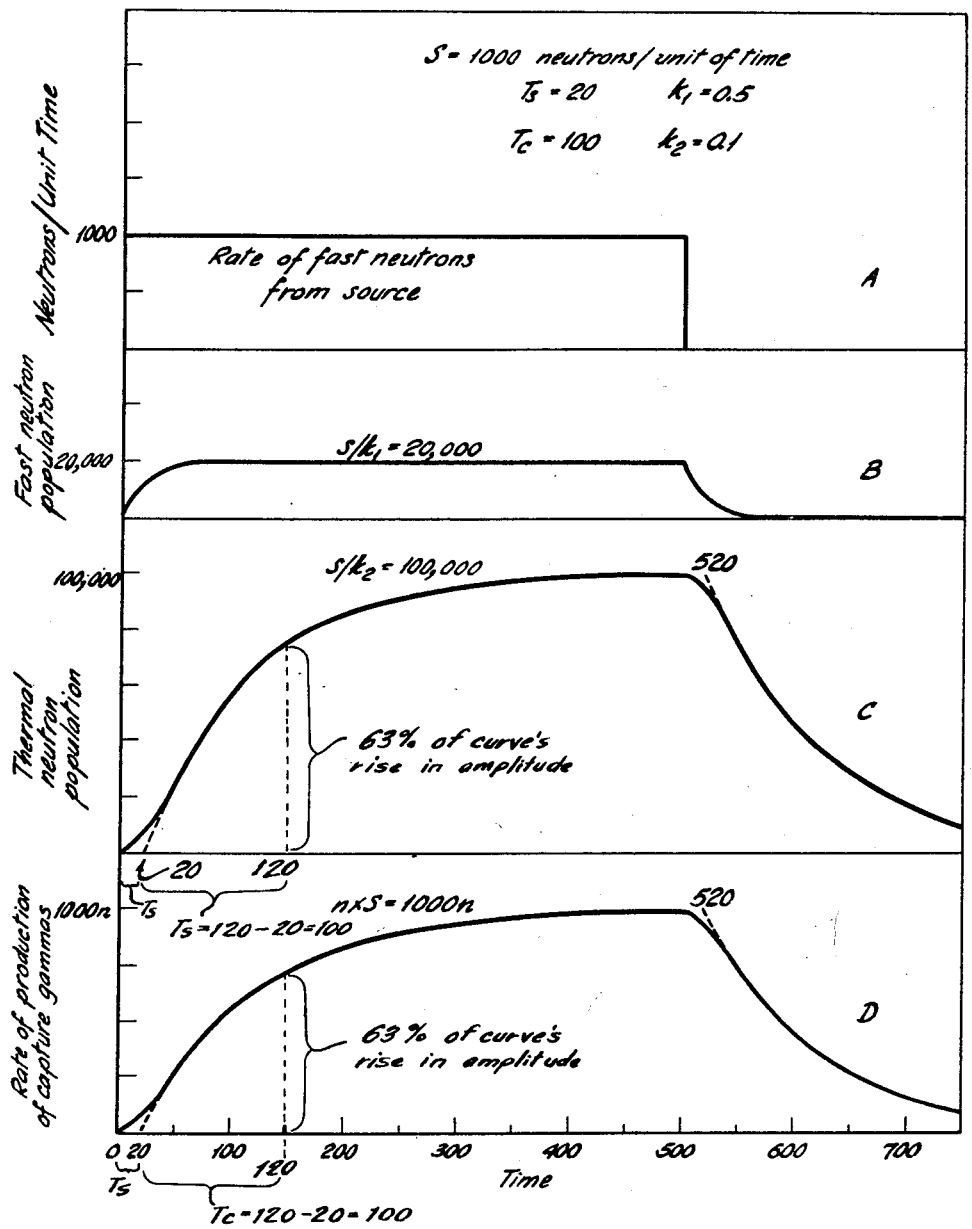

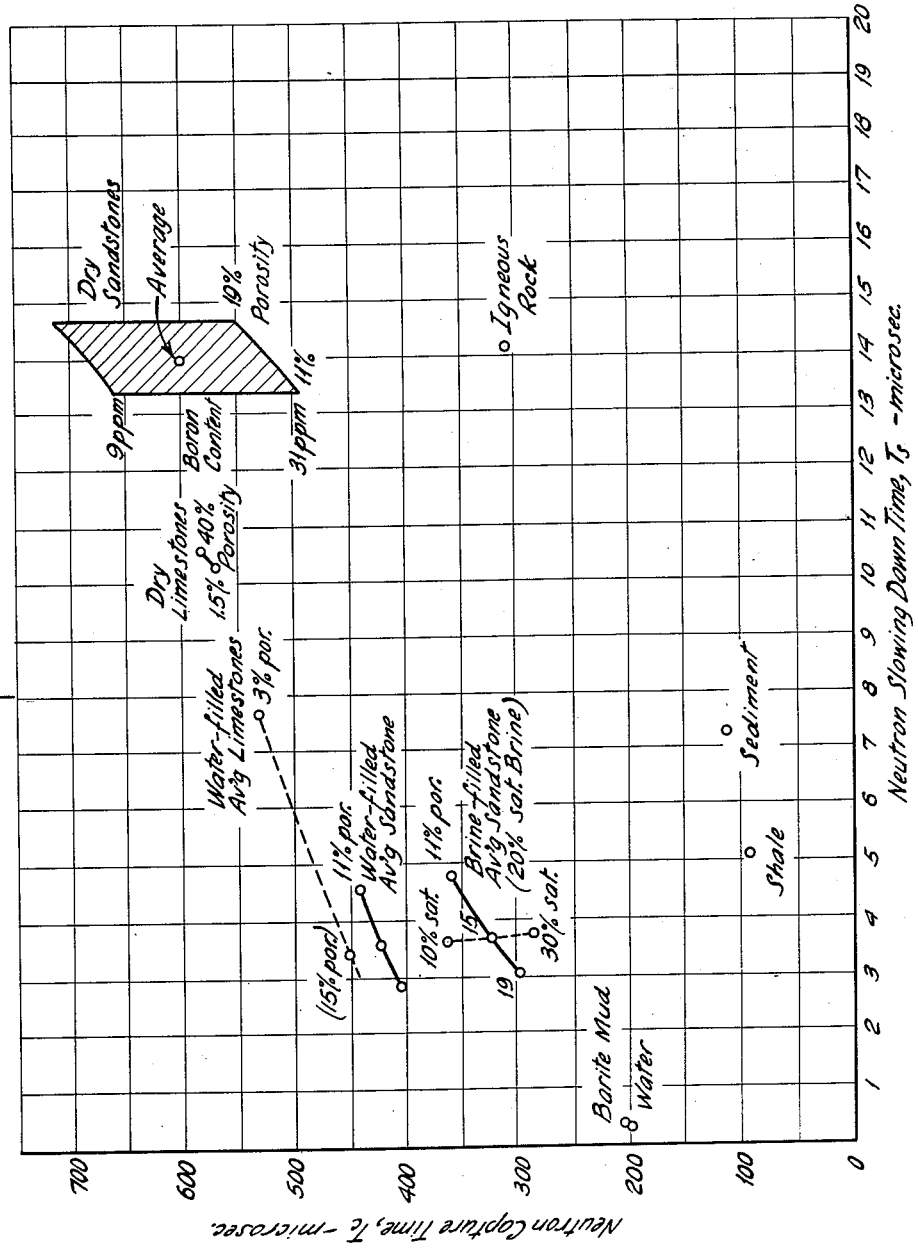

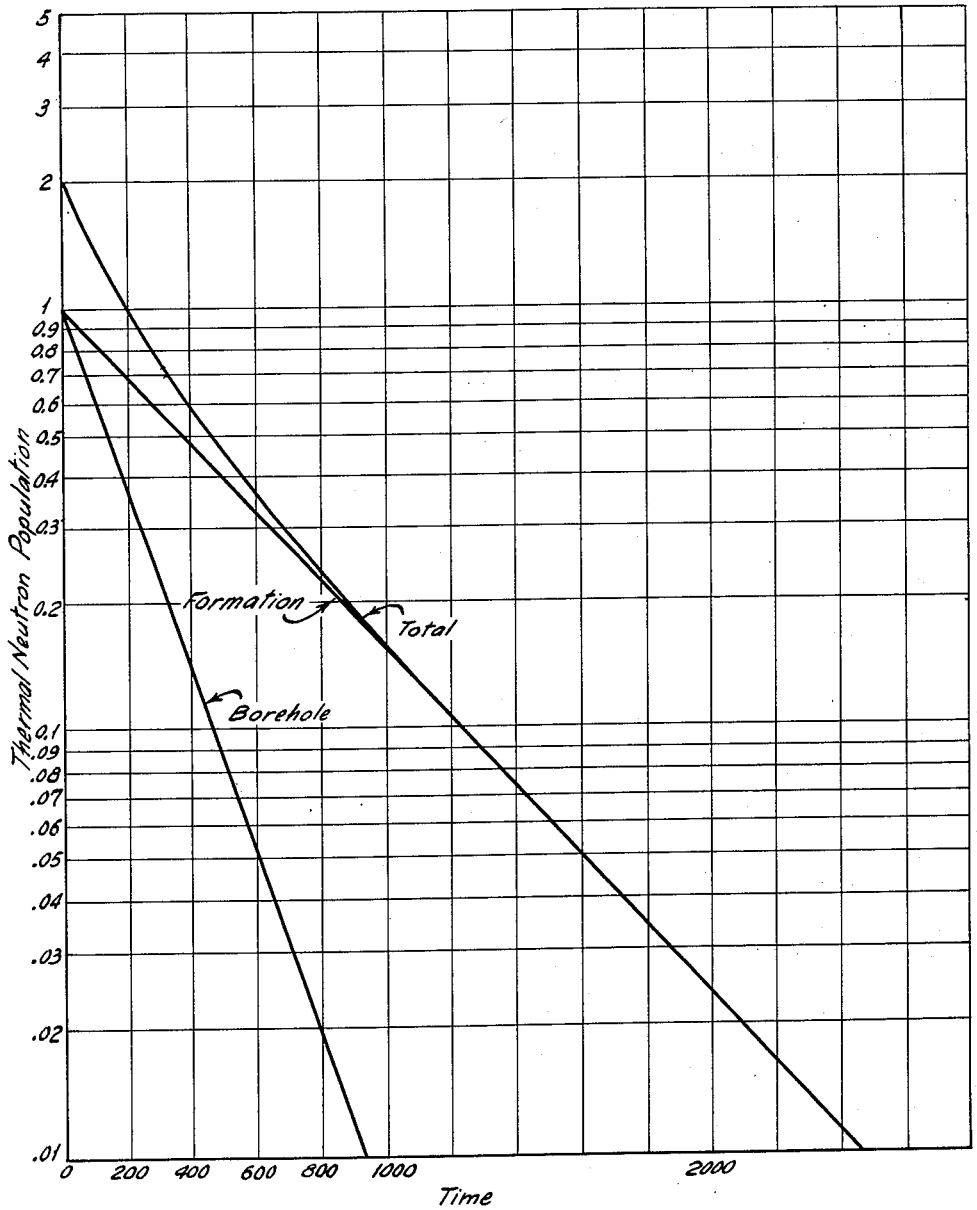

3,164,720
RADIOACTIVITY BORE HOLE FLUID LOGGING
Fontaine C. Armistead, Darien, Conn., assignor to Texaco Development Corporation, New York, N.Y., a corporation of Delaware
Filed Apr. 2, 1962, Ser. No. 186,589
27 Claims. (Cl. 250—83.3)

The present invention relates generally to logging a bore hole, including measurement of the size of a bore hole extending through an earth formation and, more particularly, it is concerned with a method of making such a measurement by radioactivity analysis.

Bore holes extending through earth formations, such as those employed in the oil-well industry, normally are of varying diameter from place-to-place as they proceed through the formation. This is due to various causes, such as differences in hardness, or porosity, or due to the presence of various faults and other irregularities existing in the formation along the path of the drill hole. The drill hole is normally filled with certain fluids, both during the drilling operation and afterward. For example, drilling mud is normally used during the drilling process and comprises various known types of liquid materials for facilitating the drilling operation. The drilling mud is pumped continuously through the drill stem into the well as it is drilled where it acts as a lubricant and serves to carry drill cuttings to the surface as the drill bit proceeds through the earth. Other fluids present in the well may include either or both oil and water. The latter is frequently in the form of a brine solution.

For various reasons it is often desirable to know the diameter of the well bore at various points along its depth. For example, the exact size of the drill hole adversely affects the conventional methods of both scattered and induced gamma ray well logging by causing variations in the distance between the logging apparatus and the formation under analysis. By knowing the exact size of the well in correlation with the gamma ray well log, it is possible to obtain a correction factor in order to compensate for variations in distance between the logging equipment and the formation.

Conventional well-calipering techniques usually involve the use of mechanical or electro-mechanical measurement devices having one or more movable feeler arms for contacting the sides of the bore hole to make the desired measurement. Appropriate means including electric circuitry is usually employed to convert the position of the feeler arms into an indication of size which may be recorded at the surface. Such apparatus serves a useful purpose. However, it may be awkward to operate under many circumstances. The presence of fluid throughout the bore hole complicates the problem.

Accordingly, it is a general object of the present invention to provide an improved method of logging, including calipering a well bore.

It is a more particular object of the present invention to provide an improved method of calipering a well bore by radioactivity analysis which is not adversely affected by the presence of fluid in the well bore.

It is still another object of the present invention to provide an improved method of calipering a well bore by radioactivity analysis which may be carried on in combination with other phases of radioactivity analysis.

The present discussion is concerned with nuclear radiation and particularly with the behavior of neutrons in various media. As is well-known, neutrons are electrically neutral, sub-atomic particles having a rest mass of the order of $1.675 \times 10^{-24}$ gm. These particles are normally considered as having a certain energy of motion as determined by their velocity, in accordance with well-known principles. In general, fast neutrons have an energy range of 1000 electron volts or higher and slow neutrons have an energy range below 1000 electron volts. For present purposes, neutrons that are slowed to a predetermined lower energy range are referred to as slow neutrons and those neutrons above that range are referred to as fast neutrons. The predetermined lower range may be determined by the energy threshold of the detector employed to measure them. Neutrons within the lower end of the slow neutron range are referred to as thermal neutrons. Thermal neutrons have an average energy of the order of 0.025 electron volt at room temperature. At the temperatures found in a conventional oil well bore hole, however, on the order of 100° C., the energy of thermal neutrons is on the order of 0.032 electron volt.

When fast neutrons are sent into a medium they are slowed down to the slow energy range, as a result of many atomic collisions, thereby reducing the fast neutron population in the medium but introducing a slow neutron population. In most cases, the slow neutrons thus produced are in the thermal range. The slow neutrons travel about in the manner of diffusing gas molecules and undergo many more collisions. After a time interval, the slow neutrons are captured by various atoms of the medium and thus removed from circulation. This capture is accompanied by the emission of nuclear radiation by the capturing atom, including a penetrative portion which, in general, comprises gamma radiation and which may be measured by an appropriate detector.

The invention is particularly concerned with certain time-dependent effects exhibited by neutrons in a medium as they are slowed from the fast to the slow ranges and thereafter captured. Specifically, neutrons in a medium are slowed down from fast neutrons to slow neutrons at a rate characteristic of the medium and, furthermore, the slow neutrons thus produced are thereafter captured at a rate, different from the slowing down rate, but also characteristic of the medium. The characteristic time for slowing neutrons from fast to slow is called the "slowing down time," symbolized as $T_s$, and the characteristic time for capturing the slowed down neutrons is referred to as the "lifetime against capture" or simply the "capture time," symbolized as $T_c$.

The slowing down and the capture of neutrons in a medium is determined by the presence, or absence, of certain known or calculable substances. Where the substance responsible for the neutron slowing down or neutron capture is known, a quantitative measurement of the substance may be made by determining its effect upon the slowing down or capture time.

Briefly stated, in accordance with one aspect of the present invention, apparatus for measuring either the neutron slowing down time or capture time or both is passed through the well bore and the effect of the hole fluid upon slowing down or capture time is measured as an indication of the quantity of well-fluid at the place of measurement, thereby to determine the size of the bore hole along its depth.

In accordance with a further aspect of the invention, a substance having a slowing down or capture time that is substantially different from that of the formation under analysis is added to the fluid within the bore hole prior to the measurement in order to alter substantially the slowing down time or capture time of the bore hole fluid as compared with that of the formation.

In accordance with one aspect thereof, the invention may be carried out by passing through a bore hole to be calipered suitable apparatus capable of producing an abruptly controllable source of neutrons and detecting the radiation subsequently emanating from the bore hole as a result thereof. More particularly, and preferably after the step of treating the bore hole fluid with a substance causing the bore hole fluid to have a substantially different time-dependent characteristic for neutrons as compared with that of the formation, the bore hole location to be calipered is irradiated with fast neutrons in a manner characterized by an abrupt change in source rate and subsequently, during a predetermined time interval, radiation emanating from the bore hole is detected and measured as an indication of the rate of change in the neutron population density in the bore hole. Preferably, the radiation is detected only during a predetermined interval of time during which the predominant factor affecting the rate of change of neutron population density is due to the bore hole fluid as distinguished from the formation.

A preferred embodiment resides in the treatment of the bore hole fluid with a neutron capturing additive which makes the neutron capture time in the bore hole substantially shorter than that of the formation surrounding it. In this case, the rate of change of neutron population density may be determined during a time interval beginning immediately after an abrupt change in irradiation rate and ending prior to the time that the effect of the formation becomes pronounced.

For additional objects and advantages and for a better understanding of the invention, attention is now directed to the following detailed description and accompanying drawing. The features of the invention which are believed to be novel are particularly pointed out in the appended claims.

In the drawing:

FIGURE 1 is a graph showing the variation with time of (B) the fast neutron population, (C) slow neutron population (thermal range), and (D) the rate of production of capture gammas all of which result from (A) a 500 microsecond burst of fast neutrons;

FIGURE 2 is a graph showing the neutron capture time $T_c$ and the neutron slowing down time $T_s$ for certain materials encountered in earth formation;

FIGURE 3b is a graph showing the total and the separate effects of a typical earth formation and contents of a typical bore hole upon the rate of change of slow neutron population density (thermal range) following such a burst of fast neutrons as described in 3a;

FIGURE 4 is a graph showing the total and the separate effects of a typical earth formation and contents of a typical bore hole upon the rate of change of slow neutron population density (thermal range), as given in FIGURE 3b, but plotted semi-logarithmically to simplify interpretation;

FIGURE 5 is a graph showing typical time-dependent neutron responses of the fluid in a bore hole and the surrounding earth formation, measured in accordance with principles of the invention; and FIGURE 6 is a diagram, partly in block form, illustrating apparatus for calipering an earth bore hole in accordance with principles of the present invention.

POPULATION DENSITY OF FAST NEUTRONS

Figure 3A:
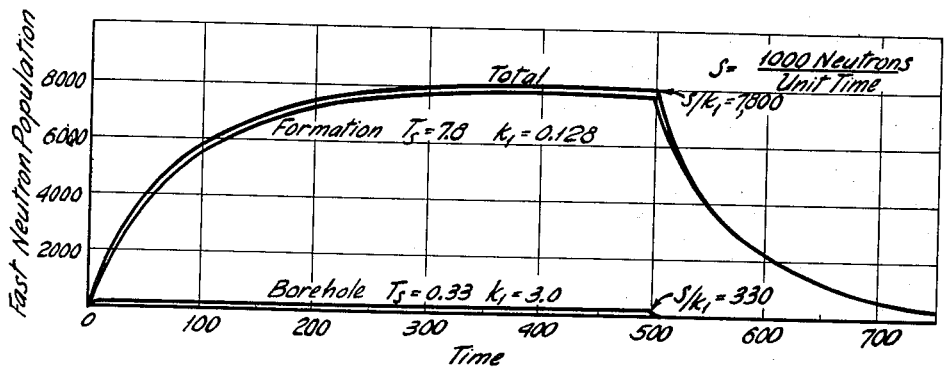
FIGURE 3a is a graph showing the total and the separate effects of a typical earth formation and contents of a typical bore hole upon the rate of change of fast neutron population density during and following a burst of fast neutrons that starts and stops abruptly.

Let us first consider the effect of irradiating a medium with fast neutrons emitted from a source capable of being turned on and off abruptly. When the source of neutrons is first turned on, the number of fast neutrons permeating the medium rises from zero to some equilibrium value which is determined by the nature of the medium. The rate of rise of fast neutrons in the medium is affected not only by the rate of rise of fast neutrons emitted by the source, but also by the rate of loss of fast neutrons by slowing down due to characteristic properties of the medium. After the fast neutron source has been on for a time long compared to the slowing-down time of the medium, the population density of fast neutrons level off at an equilibrium value such that the rate of loss of neutrons from slowing down exactly equals the gain of new neutrons from the source. Assuming a source of fast neutrons having a substantially zero time rise to its maximum value, e.g., a substantially rectangular waveform burst of neutrons, we can then consider the fast neutron population changes as determined entirely by the slowing down of neutrons, which, in turn, is determined by the medium under irradiation.

The characteristic slowing down time $T_s$ for fast neutrons in a medium is governed by the presence of relatively light chemical elements and is, in fact, determined substantially altogether by the concentration of the element hydrogen, the lightest of the elements. Particularly as applied to the analysis of an earth formation, a measurement of neutron slowing down time $T_s$ affords means for determining the concentration of oil and water therein due to the hydrogen contained in these components.

By way of example, it has been determined that a hydrogenous medium slows down fast neutrons rapidly and, hence, after turning on a source in such a medium the density of fast neutrons rapidly rises to its equilibrium value. Similarly, and by contrast, it has been determined that a dry sand slows down neutrons relatively slowly and, hence, the density of fast neutrons rises slowly to its equilibrium value in such a medium.

POPULATION DENSITY OF SLOW NEUTRONS

Considering another aspect of the invention, it has been discovered that the population density of slow neutrons rises to its equilibrium value in a manner dependent upon both the rate at which the medium converts fast neutrons to slow neutrons and the rate at which the medium captures the slow neutrons and removes them from circulation. As far as the slow neutron population is concerned, the conversion of fast neutrons to slow neutrons by slowing down constitutes the birth of slow neutrons and the capture of slow neutrons constitutes their death. In the first moment after the source of fast neutrons starts, the birth rate of slow neutrons exceeds their death rate and the slow neutron population density rises in a way determined by two constants of the medium, namely, the neutron slowing down rate and the slow neutron capture rate. After the source of fast neutrons has been on for a time long compared to the slow neutron capture time, the population density of slow neutrons levels off at a value such that the death rate by capture equals the birth rate by slowing down.

The characteristic neutron capture time $T_c$ of the medium is governed by the presence of elements which capture the slow neutron readily. The determining factor is the product of the concentration of the high capture element by its slow neutron "capture cross section."

Some important capturing elements in earth formation, along with their capture cross sections, are given in Table I. This table also includes data on certain weakly capturing elements, viz., carbon and oxygen, in order to illustrate their relative ineffectiveness despite their abundance in the media with which we are concerned.

Table I

| Element | Capture Cross Section ($10^{-24}$ cm.$^2$) | |
|---|---|---|
| H | 0.33 | |
| Li | 67 | |
| B | 750 | and for comparison |
| Na | 0.49 | |
| Al | 0.215 | C  0.0045 |
| Si | 0.13 | O  <0.0002 |
| Cl | 31.6 | |
| K | 1.97 | |
| Ca | 0.43 | |
| Ti | 5.6 | |
| Cr | 2.9 | |
| Mn | 12.6 | |
| Fe | 2.43 | |

METHOD OF CALCULATION OF $T_s$ AND $T_c$

The "slowing down time," $T_s$, for fast neutrons and the "capture time," $T_c$, for the slow, or slowed-down neutrons can be calculated in a given medium from the following formulas:

$$T_s = \frac{\bar{l}_s}{\bar{z}} \sqrt{2m} \left( \frac{1}{\sqrt{E_F}} - \frac{1}{\sqrt{E_I}} \right)$$

where $\bar{l}_s$ is the average mean free path for scattering of neutrons $\bar{z}$ is the average logarithmic energy loss per collision, related to the atomic weight by the equation:

$$z = 1 + \frac{(A-1)^2}{2A} \log_e \frac{A-1}{A+1}$$

$m$ is the neutron mass $E_I$ and $E_F$ are the initial and final neutron energies.

For practical purposes this equation becomes:

$$T_s = 1.06 \times \frac{(\text{Sum of } fA)}{(\text{Sum of } fS_s)(\text{Sum of } fz)(\text{density of mixture})} \text{ microseconds}$$

where

Sum of any term means the summation of all the terms of this kind for the individual components of a mixture $f$ is the mole fraction of a constituent, e.g., $f=0.67$ for H in $H_2O$ $A$ is the atomic weight of a constituent $S_s$ is the neutron scattering cross section for a constituent, in barns ($10^{-24}$ cm.$^2$)

$z$ is the log energy loss per collision, same as $z$ above—density is in gm./cc.

$$T_c = \frac{(\text{Sum of } fA)}{Nv(\text{Sum of } fS_c)(\text{density of mixture})}$$

where $f$ and $A$ have same meaning as above $N$ is Avogadro's number $0.602 \times 10^{24}$ atoms/mole $v$ is velocity of thermal neutrons ($2.2 \times 10^5$ cm./sec.)

$S_c$ is neutron capture cross section for any constituent (barns) or for practical purposes:

$$T_c = 7.6 \times \frac{(\text{Sum of } fA) \text{ microseconds}}{(\text{Sum of } fS_c)(\text{density of mixture})}$$

*Calculated values of $T_s$ and $T_c$.*—Some actual values of $T_s$ and $T_c$, calculated from the formulas, for various media found in oil well bore holes and in the formation surrounding the bore hole, including formations of various specific gravities and porosities are given in Table II.

Table II

[All times in microseconds]

| Medium | $T_s$ | $T_c$[2] | Medium | $T_s$ | $T_c$[2] |
|---|---|---|---|---|---|
| Water[1] or oil | 0.32 | 205 | Av'g. Sandstone, 15% por., filled with— | | |
| Barite mud | 0.38 | 209 | | | |
| Av'g. Igneous Rock, sp. gr. 2.70 | 14.2 | 306 | 10% conc. brine | 3.67 | 366 |
| Av'g. Shale, SG 2.65 | 5.1 | 95 | 15% conc. brine | 3.70 | 344 |
| | | | 20% conc. brine | 3.73 | 324 |
| Av'g. Sandstone—SG/porosity: | | | 25% conc. brine | 3.73 | 307 |
| 2.14/19% | 14.7 | 635 | 30% conc. brine | 3.77 | 292 |
| 2.25/15% | 14.0 | 603 | Av'g Sandstone filled with 20% conc. brine, and having— | | |
| 2.36/11% | 13.4 | 578 | | | |
| Av'g. Limestone—SG/porosity: | | | 11% poros | 4.79 | 359 |
| 2.68/4% | 10.6 | 585 | 15% poros | 3.73 | 324 |
| 2.72/3% | 10.5 | 578 | 19% poros | 3.02 | 296 |
| 2.76/1.4% | 10.3 | 570 | Brine: | | |
| Av'g. Sediment, SG 2.65 | 7.3 | 114 | 10% conc. | .328 | 137 |
| | | | 15% conc. | .331 | 117 |
| Av'g. Sandstone, water-filled: | | | 20% conc. | .335 | 103 |
| 11% por | 4.62 | 442 | 25% conc. | .338 | 91.8 |
| 15% por | 3.60 | 423 | 30% conc. | .342 | 83.3 |
| 19% por | 2.86 | 405 | | | |
| Av'g. Limestone, water-filled: | | | | | |
| 3% por | 7.75 | 532 | | | |
| (15%) | 3.50 | 451 | | | |

[1] Throughout this table it should be understood that "water" means "water or oil". They are indistinguishable by the present means.
[2] All $T_c$ values for sandstone are plus or minus 13% for the range of boron content.

The chemical compositions assumed in calculating the time constants of the various earth formations are derived from Rankama and Sahama, Geochemistry, University of Chicago Press, 1950, especially page 226, and from Brian Mason, Principles of Geochemistry, John Wiley and Sons, 1952, especially page 130. Due account is taken of the trace quantities of those elements such as lithium, boron, cadmium, indium, mercury and others which are extraordinarily effective in capturing neutrons.

Table III

ATOMIC PERCENT OF HIGH CAPTURE ELEMENTS WHICH WOULD REDUCE CAPTURE TIME IN AVERAGE EARTH MATERIAL OR WATER BY HALF

| Element | Percent | Element | Percent | Element | Percent |
|---|---|---|---|---|---|
| Li | 0.5 | Br | 5 | Eu | 0.006 |
| B | 0.05 | Mo | 13 | Gd | 0.0008 |
| Cl | 1.0 | Rh | 0.2 | Tb | 3.3 |
| K | .16 | Pd | 5.5 | Dy | 0.03 |
| Sc | 1.5 | Ag | 0.6 | Ho | 0.6 |
| Ti | 7.6 | Cd | 0.01 | Tm | 0.3 |
| V | 7 | In | 0.17 | Lu | 0.2 |
| Cr | 13 | Sb | 7 | Hf | 0.3 |
| Mn | 2.5 | Te | 8 | Ta | 1.6 |
| Fe | 18 | I | 5 | W | 1.8 |
| Co | 1 | Cs | 1.3 | Re | 0.4 |
| Ni | 7 | La | 4 | Os | 2 |
| Cu | 11 | Ce | 5.5 | Ir | 0.07 |
| Ge | 12 | Pr | 3.3 | Pt | 4 |
| As | .8 | Pm | 0.6 | Au | 0.3 |
| Se | 2 | Sm | 0.004 | Hg | 0.08 |
| | | | | U | 4.5 |

*Computation of time dependent effects.*—The way in which neutron population density varies with time upon starting and stopping the neutron source can be expressed in terms of the above-discussed time constants. Thus, where $k_1 = 1/T_s$ and $k_2 = 1/T_c$ BUILD UP, upon turning on source of strength S neut./sec.:

$$\text{Fast neutron population} = \frac{S}{k_1}(1 - e^{-k_1 t})$$

(Eq. 1)

$$\text{Slow neutron population} = \frac{S}{k_2} \cdot \frac{k_2(1-e^{-k_1 t}) - k_1(1-e^{-k_2 t})}{k_2 - k_1}$$

(Eq. 2)

DECAY, upon turning off source, after it has been on at least 3 times $T_c$:

Fast neutron population $= \frac{S}{k_1} e^{-k_1 t}$ (Eq. 3)

Slow neutron population $= \frac{S}{k_2} \frac{k_2 e^{-k_1 t} - k_1 e^{-k_2 t}}{k_2 - k_1}$ (Eq. 4)

These equations are plotted in FIGURE 1, showing how the neutron populations and the neutron gamma rate vary with time in a fictitious example. Curve A shows the source coming on suddenly at full strength at $t=0$ and going off suddenly at $t=500$. Curve B shows the fairly rapid build-up of the fast neutron population to its equilibrium level upon starting the source and the equally rapid decay upon stopping the source. Curve C shows the more complex build-up and decay of the thermal neutron population. Note that curve C shows the exponentially controlled rise and decay shapes, just as curve B does, with the one exception that C gets off to a delayed rise and also a delayed decay. It is useful to note that this delay is determined by $T_s$. In fact Equations 2 and 4 are very closely approximated over most of their range by a pure exponentially controlled rise and decay curve, of single time constant, $T_c$, provided they are plotted as if starting to rise at $t=T_s$ instead of at $t=0$, and as if starting to decay at $t=500$ plus $T_s$ instead of at $t=500$. Thus, upon observing such a curve C, one is able to deduce $T_s$ and $T_c$ simply by inspection. $T_s$ is the delay before the C-curve begins to assume a pure exponential shape, and $T_c$ is the time thereafter before the C-curve is within $1/e$ (i.e. 1/2.718) of its final value.

Curves B and C give neutron population, a quantity which would be measured directly by use of fast and thermal neutron detectors. However, if we measure thermal neutron-induced gammas we must expect something different. The shape of the gamma rate plotted against time must of course resemble the thermal neutron curve, C, but the height of the curve—see curve D—has to be equal to $n \times S$, the number of gamma rays released per captured neutron times the number of neutrons per unit time released into the medium, and $n$ is nearly the same for all neutron capturing materials. Therefore, the $n$-gamma curve, D, shows the same time behavior as the thermal neutron population curve, C, but does not depend on the constant, $k_2$, as does curve C, for the height to which it rises before leveling off. This comes about from the fact that ultimately the neutron capture rate must equal the neutron production rate, regardless of any time factors.

Another way of showing why this is so is as follows. Suppose curve C were plotted again, this time for $T_c = 200$, and $k_2 = .005$. Now with slow neutrons able to escape capture for twice as long as before, the population will level off at twice the previous magnitude. Equation 2 shows this by having $k_2$ in the denominator. The neutron capture rate would be twice as great as before, since the neutron population is twice as great as before, but this increase is exactly compensated for by the fact that the medium allows the neutrons to live twice as long before capture. The net effect then is that the neutron capture rate, and, hence, the gamma production rate, is unchanged by a change in $T_c$ (or in its reciprocal, $k_2$).

Thus curve D represents the time dependence of the slow capture gamma rate, which might be formulated thus:

BUILD UP

Slow neutron capture gamma rate $= nS \frac{k_2(1 - e^{-k_1 t}) - k_1(1 - e^{-k_2 t})}{k_2 - k_1}$ (Eq. 2')

DECAY

Slow neutron capture gamma rate $= nS \frac{k_2 e^{-k_1 t} - k_1 e^{-k_2 t}}{k_2 - k_1}$ (Eq. 4')

where $n$ is the number of gamma rays released per neutron capture.

Inasmuch as the neutron population density may be measured directly in or adjacent to the medium under analysis, a bore hole to be calipered by time dependent analysis of the fluid contained therein may conveniently be observed in this manner. However, in certain applications the flux of neutron induced gammas may be measured rather than the slow neutron population density. In accordance with the latter method, in order to measure the neutron slowing down time and neutron capture time, one need observe the time rates of change of the appropriate gamma ray fluxes since these fluxes faithfully reflect the neutron densities. Slow neutrons are the principal source of induced gamma rays and, therefore, $T_c$, which is the slow neutron capture time, is readily obtained from slow neutron induced gammas; however, there are also characteristic gamma rays induced by fast neutrons, particularly those generated by neutrons undergoing inelastic scattering in the process of slowing down.

Although $T_s$ and $T_c$ of the fluid in a bore hole may conceivably be observed directly in the time dependent neutron and neutron gamma behavior of the fluid, nevertheless, in most cases the effect due to the bore hole content will be obscured by the surrounding formation, unless means are employed to separate the bore hole indication from that of the formation.

In accordance with features of the present invention, the effect of the bore hole fluid may be distinguished from that of the formation by virtue of the difference in the respective time constants ($T_s$ and $T_c$) of the fluid and formation, those of the fluid being measurably shorter than those of the formation.

By way of example, reference is made to FIGURE 2, which illustrates the very short capture $T_s$ for water, oil, or barite drilling mud, as compared to that of a typical earth formation.

Referring to FIGURE 3a, there is shown a graphic representation of the fast neutron population in a typical bore hole fluid and surrounding formation in response to a pulsed neutron source coming on abruptly in which $T=0$ and being shut off abruptly at $T=500$ microseconds. This illustration shows the composite curve due to the bore hole contents and the formation, together with its component parts, consisting of a bore hole component rising sharply (because of short $T_s$) to a low plateau (because of small $S/k_1$) and a formation component rising slower (because of longer $T_s$) to a higher plateau (because of large $S/k_1$). In this illustration, the data for well fluid and water-filled limestone are taken from FIGURE 2. Clearly, the time constant for the bore hole component alone could be determined by measuring the time to complete 63% of its neutron population rise (or decay) and subtracting this value from the total time required to reach the maximum or plateau level of neutron population.

Figure 3B:
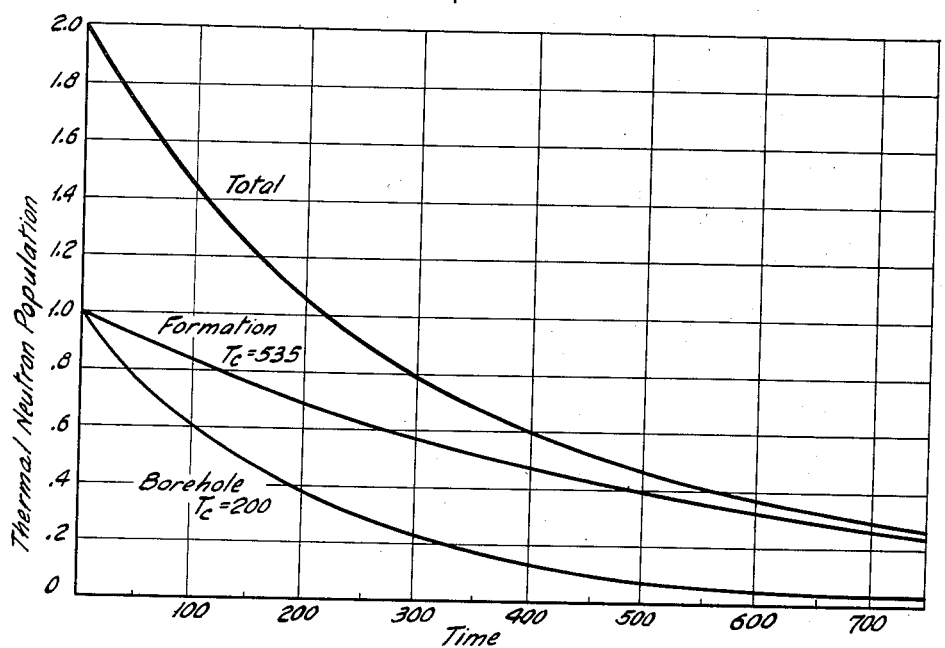

As an example of the separation of the thermal neutron curve for a formation from that of a bore hole see FIGURES 3 and 4. In FIGURE 3b are plotted the decay portions only of the thermal neutron population curves, such as those of FIGURE 1c for well fluid and for water filled 3% porous limestone. The composite curve in FIGURE 3b may be somewhat difficult to analyze for those components but by replotting semi-logarithmically, as in FIGURE 4, the components may be readily separated by the method (well-known in nuclear physics) of subtracting off exponentials. Thus, given the curve labeled TOTAL in FIGURE 4, one may draw a straight line which the composite curve approaches at large time values. This line is the pure exponential for formation alone. Subtracting the formation curve values from the TOTAL curve values gives the bore hole curve value. NOTE.—had the formation been shale, which has $T_c$ shorter than $T_c$ for well fluid, the first straight line drawn would have been the bore hole curve. In any case, one curve that has thus been subtracted out will be recognized by its 200 microsecond time constant as the bore hole curve, and the other will be the formation curve. This subtracting of components can be done electrically as well as manually. In fact, it is possible to build into the logging tool the means for continually subtracting off the formation contribution, where it is known or determinable. Known types of signal generators may be employed to subtract off the formation component continuously, where its characteristic is known or previously determined. The composite output would simply be mixed at the time of each pulse of neutrons, with a negative signal adjusted in magnitude to equal the formation neutron gamma-ray count rate, and this signal would decay with a time constant characteristic of the formation.

In accordance with a further embodiment of the invention, in order to provide further distinction between bore hole contents and the surrounding formation, it is preferred to add a strong neutron capturing element to the bore hole fluid and thus cause its thermal neutron-gamma rate to change very rapidly, in many cases almost instantly with the source rate itself. The remaining time dependent signal would then be due to the formation alone. Considering as an example the separation of the effect upon $T_c$ due to the contents of a bore hole from the effect due to the earth formation surrounding the hole, the behavior in this case would be substantially like that shown in FIGURE 3a except that the time constants would here be those for thermal-neutron captures, rather than for neutron slowing down. The contribution of the bore hole contents would rise and drop away abruptly just as in FIGURE 3a, leaving the contribution of the formation as substantially the only time-varying signal, so that the time constant, $T_c$, for the hole contents can be readily deduced.

Referring now to FIG. 5, there is shown a graph illustrating the neutron capture gamma rate of the contents of a typical bore hole treated with a neutron capturing additive prior to irradiation, as compared with that of a typical earth formation. It is noted that the capture gamma rate of the bore hole component rises rapidly as a pulse of fast neutrons is emitted in the bore hole and, conversely, the capture rate falls of rapidly upon abrupt termination of the neutron pulse. Due to the comparatively longer time constant of the material comprising the formation, the neutron capture gamma rate of the formation component rises comparatively slowly during the pulse of fast neutrons and decays comparatively slowly upon cessation of the pulse.

As will be seen from the foregoing, the neutron capture rate builds up substantially in the bore hole during the time $T_B$ that the pulse of neutrons lasts but builds up only slightly in the formation during this time. Thus, by observing neutron gammas at the time $T_o$ that the source is turned on and by observing them for a time $2T_B$, approximately twice the duration of the pulse $T_B$, the measured response will be indicative substantially entirely of the neutron capture gamma rate of the bore hole contents. In repeating the cycle of operation, it is preferable to permit the neutron capture gammas to decay for the time interval of at least $T_F$, which is the neutron capture time of the formation.

As an illustration of a suitable high capture additive which may be employed to treat the well fluid, cadmium is considered suitable, particularly in view of its high capture value of 2500 barns. Thus, if as little as 0.25 atomic percent of cadmium is added to barite drilling mud, the thermal neutron capture time of the mud is reduced to about 22 microseconds. As another example of a suitable additive, 9 atomic percent of chlorine added to barite drilling mud reduces the capture time to 40 microseconds. The cadmium can be added to the drilling mud as an appropriate compound, for example, as cadmium sulfide. Likewise, the chlorine can be added for example as saturated brine. Other suitable additives may be determined by their capture cross section and include, for example, mercury, cobalt, samarium, europium, gadolinium, iridium, boron and lithium.

The herein described measurement techniques may be carried out by means of equipment comprising known types of pulsed neutron sources and radiation detection apparatus. However, since such measurement must be made in the bore hole through an earth formation, certain considerations must be observed. In general, it is necessary that such an apparatus be limited to a minimum size and weight. Accordingly, apparatus such as that shown in FIGURE 6 may be employed.

Referring particularly to FIGURE 6, a bore hole 10 is shown as traversing several earth formations as 11, 12, 13 and 14 and being filled with a fluid 15, which may include an additive in accordance with certain aspects of the invention as discussed above. Within the bore hole 10 there is shown a neutron gamma ray logging instrument 16 comprising essentially a housing 17 containing a controlled source of neutrons 18, a gamma ray detector 19, and a timer or gating circuit 20. A trace recorder 21 may also be included within the housing 17 and coupled to the output of the detector 19. Considered broadly, the detector 19 may also include a high voltage supply which serves to activate the detector unit, per se, and a preamplifier for enhancing the detector signal for transmission to a power amplifier 22 at the surface. The timer 20 is coupled to the neutron source 18 and the detector 19 to provide means for establishing the desired time relationship between the source 18 and the detector 19. The logging instrument 16 is suspended by means of a cable 23, which includes suitable conductors for conveying the preamplified output of the instrument 16 to the surface. The cable 23 passes over a suitable measuring device 24 by means of which the depth or position of the instrument 16 can be continuously determined in order to correlate its position with the measurement obtained thereby. The preamplified output of the detector 19 is coupled to the amplifier 22 at the surface which, in turn, is coupled to an appropriate cathode-ray oscilloscope 25.

The source 18 preferably comprises an abruptly controllable apparatus such as a linear accelerator capable of pulsed operation and suitable for providing a timed burst of fast neutrons when used with a suitably chosen neutron-emitting target, for example, such as that described in Nucleonics, vol. 9, pages 51–57, October 1951. Likewise, other apparatus may be used, such as a betatron in combination with a neutron-emitting target. A conventional neutron source, for example, polonium-beryllium or radium-beryllium, may be used in certain instances and a pulsed effect may be attained by means of a mechanically or electro-mechanically controlled shutter for intermittently shielding the alpha radiation employed to bombard the beryllium to produce neutrons. Suitable apparatus may comprise a shutter in the form of a rotatable disk of suitable shielding material having one or more apertures therein for intermittently exposing the neutron-emitting target to a source of alpha particles as it rotates about its axis. In any event, whatever the source 18 of pulsed neutrons, the timer 20 is preferably suitably coupled therewith in order to control the pulse rate of the neutron source 18 in accordance with a predetermined schedule. The output of the timer 20 is also coupled by suitable means to a display device, shown as the cathode-ray oscilloscope 25 in the illustrated embodiment. In accordance with the illustrated embodiment, the timer signal is applied to the horizontal deflection system of the display device 25 and the detector output signal is applied to the vertical deflection system of the display device 25. The detector 19 is positioned with respect to the pulsed neutron source 18 and the bore hole fluid 15 to be observed such that time dependent effects produced in the fluid 15 by the source 18 may be observed by the detector 19.

The apparatus of FIGURE 6 is adapted and arranged to provide a pulsed neutron source under the control of the timer 20. The timer 20 is preferably an electronic device suitable for simultaneously triggering both the neutron source and the display device. More particularly, the timer preferably comprises a gating circuit suitable to initiate the horizontal sweep of the respective oscilloscope at the same instant that the neutron source is triggered on or off, as the case may be. Electronic timing apparatus suitable for this purpose is well-known. (See, for example, Electronics—Experimental Techniques, by Elmore and Sands, McGraw-Hill, 1949.) A magnetic-tape recorder or the like may be coupled to the amplifier in order to record the output signal provided thereby. Alternatively, or additionally, a trace recorder may be coupled to the rate meter either together with, or in lieu of, a cathode-ray oscilloscope.

In accordance with one aspect of the invention employing this apparatus to determine the size of a bore hole as a function of the neutron capture rate of the bore hole contents, the logging instrument may be lowered into the well to the location to be calipered and the timer may be adjusted to send a signal to turn on the fast neutron source and simultaneously to initiate the oscilloscope sweep. The pulsed neutron source reaches its full amplitude substantially at once and the gamma ray detector observes the rise in neutron gamma rays with time as a measure of the neutron capture time $T_c$ of the bore hole content under investigation. The output signal of the detector will appear on the appropriate oscilloscope, which may be calibrated to give a direct indication of the neutron capture time $T_c$. Preferably, the detector response may be recorded, as by means of a magnetic tape recorder or the like, to provide a record for correlation against the position of the logging head. In order to observe the neutron capture rate of the bore hole content, as distinguished from the formation, the timer may be suitably adjusted and arranged to control the detector in order to render the detector sensitive to that portion of the radiation indicative primarily of the bore hole contents and to render the detector insensitive to that portion of the radiation indicative primarily of the formation. More particularly, this may be accomplished by rendering the detector operative only during the interval of time that the neutron capture effect is due primarily to the compartively short time constant of the bore hole. As previously indicated, the compartively short time constant of the bore hole content will be further emphasized in the case where the bore hole fluid is treated with a neutron capture additive as herein set forth.

In accordance with a preferred embodiment, as discussed above in regard to FIGURE 5, the detector may appropriately be rendered operative as the source is turned on and maintained in operation for approximately twice the time constant of the bore hole contents, then rendered inactive for a period comprising substantially the remainder of the time constant for the formation, whereupon the cycle may be repeated by turning on the source and rendering the detector operative again, etc. The duration of the neutron pulse may be of the order of magnitude of the time constant of the bore hole content, or somewhat shorter, whereby the neutron capture rate is affected primarily by the shorter time constant of the hole content.

Is is noted that the technique of treating the fluid content of a well with a neutron capturing additive is facilitated by the presence of the usual circulating pump at the well site, which provides convenient means for producing a comparatively homogeneous fluid content throughout the well.

The logging techniques of the present invention for selectively logging bore hole fluids may be readily employed to measure characteristics of a bore hole other than dimentions alone, i.e. other than mere caliper log. In a case where the bore hole fluid is of a type which provides substantially the same radiation response, per unit volume throughout the region logged, the log provides a caliper log as herein set forth. However, it is also possible to determine the nature of fluids that have seeped into or been intentionally drawn into the bore hole from the surrounding formation by observing the difference in response on the radiation logging signal derived from the well fluid. Such fluids may be caused to enter the bore hole from the formation by reducing the bore hole pressure. The bore hole pressure may be reduced by means of a pump at the surface. In a liquid filled well the pressure in the lower regions may be reduced by withdrawing liquid from the upper regions of the well in order to reduce the pressure in lower regions thereof. Other known means may be employed for reducing the pressure in the well. It is to be understood that the present methods may be used for locating fluids from the formations whether they are in the liquid or gaseous phase so long as the displacing fluids cause a measurably different response in the well fluid logging signal produced according to the present method of logging. Entry of fluids including water, oil or gas from the surrounding formations into the well bore may be more readily located in accordance with applicant's method wherein a neutron reactive additive is added to the bore hole fluid prior to the logging run, as discussed in greater detail above. This is done in order to assure that the thus treated well fluid has a substantially different effect on the logging signal than formation material and fluid from the formation during the time interval when applicant's logging system observes only well fluid. When the treated well fluid is displaced by formation fluid such as oil or water, the logging signal of the bore hole contents will be substantially affected.

It is contemplated that applicant's logging method to locate differences in the nature of fluids in a bore hole, which may indicate zones of fluid entry from the formation into the well, may be carried out with a logging instrument having attached thereto an ordinary mechanical caliper device so that the caliper information may be correlated with the logging signal, as shown for example in U.S. Patent 2,761,977 issued September 4, 1956, to A. S. McKay.

In carrying out applicant's method for locating regions of fluid entry from the formation into the bore hole it is contemplated that the method may be advantageously carried out by running two logs. Preferably the well fluid should be treated with a strong neutron-capturing material as described above prior to running these two logs. The first log is run with the well under normal pressure and the second log is run with the well under reduced pressure as described above so that the difference in the two logs will show where the fluid has entered the bore hole following change in well fluid pressure. It is understood that both of these logs are time selective well fluid logs as described above wherein the logging signal is indicative of a characteristic of the bore hole contents to the substantial exclusion of radiation effects due to the adjacent formation. It is further contemplated that the first of these logs may be run as the logging instrument is lowered into the bore hole through the region of interest and that the pressure is then reduced, as described above, after the instrument has been lowered to the lowermost point of interest. After waiting sufficient time to permit entry of the fluid from the formation into the bore hole under the conditions of reduced pressure the logging instrument is then drawn upwardly through the region of interest to conduct the second log. By comparison of these two logs the points of well fluid entry into the bore hole may be determined.

This application is a continuation-in-part of application Serial No. 546,702, filed November 14, 1955, now abandoned.

While certain specific embodiments have been shown and described, it will, of course, be understood that various modifications may be made without departing from

I claim:

1. The method of logging a well bore which comprises passing through the bore an instrument containing an abruptly controlled source of nuclear radiation and a detector of radiation, irradiating the contents of the well bore with neutrons in a manner characterized by an abrupt change in source rate, and selectively detecting and measuring radiation emanating from the bore hole contents as a result thereof to the substantial exclusion of interference due to radiation from the formations which results from said irradiation.

2. The method of logging a well bore which comprises treating the fluid content thereof with a substance capable of altering the characteristic neutron capturing time of the contents, irradiating the contents at a location to be logged with a source of fast neutrons characterized by an abrupt change in source rate and selectively detecting and measuring penetrative radiation emanating from the contents as a result thereof during the altered interval of time to the substantial exclusion of interference due to radiation from the formations which results from said irradiation.

3. The method of logging a well bore having a fluid content whose neutron capturing rate has a time constant of predetermined duration and wherein the time constant of the neutron capturing rate of the formation surrounding the well bore is of longer duration comprising the steps of irradiating the contents of the bore hole at a predetermined location with fast neutrons in a manner characterized by an abrupt change in source rate, detecting and measuring radiation emanating from said contents during said predetermined interval of time, rendering said detector inoperative during the succeeding interval of time representing the remainder of the time constant of said formation, whereby the detected radiation is indicative of the neutron capture effect of the well contents to the substantial exclusion of interference due to radiation from the formations which results from said irradiation.

4. The method of logging a well bore having a fluid content whose neutron capturing rate has a time constant of predetermined duration and wherein the time constant of the neutron capturing rate of the formation surrounding the well bore is of longer duration which comprises lowering a logging instrument containing an abruptly controllable source of fast neutrons and a detector of penetrative radiation to a position in the well bore to be logged, irradiating the well contents with fast neutrons at the location of measurement in a manner characterized by an abrupt change in source rate, rendering the detector operative only during the interval of time when the neutron capture effect is due primarily to the comparatively short time constant of the bore hole contents and providing a display proportional to the rate of occurrence of the detected radiation as an indication of the neutron capture rate of the well contents at the place of measurement.

5. The method of claim 4 wherein the detector is rendered operative as the source of neutrons is turned on and maintained in operation for approximately twice the time constant of the bore hole contents and then rendered inactive for a period comprising substantially the remainder of the time constant for the formation.

6. The method of claim 5 wherein said steps are repeated successively at various points along the well bore and wherein measurement of the neutron capture rates at successive locations are recorded in correlation with the position of the detector in the bore hole thereby to provide a log of the bore hole at various locations.

7. The method of logging a well bore having a fluid content and wherein the characteristic neutron capture time of the formation surrounding the well bore is of predetermined duration, comprising the steps of treating the fluid contents of the bore hole with an additive having a comparatively high neutron capture cross section whereby the neutron capture time of the well content is shortened substantially as compared with the capture time of the formation, passing a logging instrument containing an abruptly controllable source of fast neutrons and a detector of penetrative radiation through the bore hole to a position in the well bore to be logged, irradiating the well contents with fast neutrons at a location of measurement in a manner characterized by an abrupt change in source rate, detecting radiation resulting from neutron capture during the interval of time when the neutron capture effect is due primarily to the capture of neutrons by the bore hole contents and providing a display proportional to the rate of occurrence of the detected radiation during the time that the neutron capture effect is due primarily to the well contents to the substantial exclusion of radiation due to the capture of neutrons by the formation as an indication of the neutron capture rate of the well contents at the place of measurement.

8. The method of claim 7 wherein the radiation rate is detected and displayed as the source of neutrons is turned on, continuously detected and displayed for approximately twice the time constant of the bore hole contents followed by an inactive period of detection and display comprising substantially the remainder of the time constant for the formation.

9. The method of claim 3 wherein the radiation detected during said predetermined interval of time comprises induced gamma radiation.

10. The method of claim 3 wherein the radiation detected during said predetermined interval of time comprises neutron radiation.

11. The method of claim 2 wherein the radiation detected during said altered interval of time comprises induced gamma radiation.

12. The method of claim 7 wherein the radiation detected during said predetermined interval of time comprises induced gamma radiation.

13. The method of logging a fluid-containing bore hole traversing an earth formation wherein the time dependent neutron characteristic of the fluid contents of the bore hole is significantly different from the time dependent neutron characteristic of said earth formation whereby the intensity of certain radiation emitted from said contents as the result of neutron irradiation thereof will be of maximum intensity during a first time interval following irradiation thereof and whereby certain radiation emitted from said earth formation as a result of neutron irradiation thereof will be of maximum intensity during a second time interval, said first time interval being different than said second time interval due to the different time dependent neutron characteristic of said substance and said earth formation, which comprises the steps of irradiating the bore hole contents and adjacent earth formation with a burst of neutrons and detecting radiation resulting from said burst in the bore hole substantially only during said first time interval to the substantial exclusion of said second time interval, whereby the detected radiation is predominantly due to radiation emanating from the bore hole contents while minimizing the detection of radiation resulting from irradiation of the formation.

14. The method of claim 13 further characterized by the preliminary step of introducing into the bore hole as a constituent of the bore hole contents a substance which has a substantially different time dependent neutron characteristic than said earth formation in order to alter the time dependent neutron characteristic of the bore hole contents prior to irradiation with said burst of neutrons.

15. The method of claim 14 wherein said substance has a substantially shorter characteristic neutron capture time than water.

16. The method of claim 13 wherein the detected radiation comprises gamma rays.

17. The method of claim 15 wherein the detected radiation comprises gamma rays.

18. The method of logging a fluid-containing bore hole traversing at least one earth formation wherein the average lifetime of neutrons in the fluid contents of the bore hole is significanltly shorter than the average lifetime of neutrons in said formation whereby the intensity of certain radiation emitted from said fluid contents as the result of neutron irradiation thereof will be of maximum intensity during a first time interval following neutron irradiation thereof and whereby certain radiation emitted from said earth formation as a result of neutron irradiation thereof will be of maximum intensity during a second time interval, said first time interval occurring sooner after irradiation than said second time interval due to the shorter average lifetime of neutrons in said substance than in said earth formation, which comprises the steps of irradiating the bore hole contents and adjacent earth formation with a burst of neutrons and detecting and recording in correlation with the location in the bore hole the intensity of radiation resulting from said burst substantially only during said first time interval to the substantial exclusion of said second time interval, as an indication of a characteristic of the bore hole contents at said location.

19. The method of claim 18 further characterized by the preliminary step of introducing into the bore hole as a constituent of the bore hole contents a substance which has a substantially shorter average lifetime for neutrons than water in order to alter the time dependent neutron characteristic of the bore hole contents prior to irradiation with said burst of neutrons.

20. The method of logging a fluid-containing bore hole traversing an earth formation wherein the time dependent neutron characteristic of the fluid content of the bore hole is significantly different from the time dependent neutron characteristic of said earth formation whereby the intensity versus time response of certain radiation emitted from said contents as the result of neutron irradiation thereof will be different than the intensity versus time response of certain radiation emitted from said earth formation as a result of neutron irradiation thereof, which comprises the steps of irradiating the bore hole contents and adjacent earth formation with a burst of neutrons, detecting radiation resulting from said burst in the bore hole, deriving a first signal which is proportional to the intensity versus time response of said detected radiation, generating a second signal which is substantially proportional to the intensity versus time response of said earth formation, combining said two derived signals in opposition in order to provide a resultant signal which varies according to the difference between said two combined signals, and recording said resultant signal in correlation with the location of the detected radiation in the bore hole in order to provide a record of the intensity versus time response of said bore hole contents to the neutron burst.

21. The method of logging according to claim 1 wherein said instrument is passed through a bore hole containing fluid which provides substantially the same radiation response per unit volume throughout the region logged and the radiation measurement provides a measure of the quantity of well fluid from place to place whereby the log provides a caliper of the well bore.

22. The method of claim 1 which is preceded by the preliminary step of reducing the pressure of the well fluid in a region of the well to cause fluid entry from the formation into the well and wherein the logging instrument is thereafter passed through said region to conduct a log thereof which provides a logging signal indicative of regions of fluid entry into said well bore.

23. The method of logging according to claim 7 wherein said instrument is passed through a bore hole containing fluid which provides substantially the same radiation response per unit volume throughout the region logged and the radiation measurement provides a measure of the quantity of well fluid from place to place whereby the log provides a caliper of the well bore.

24. The method of claim 7 which is preceded by the preliminary step of reducing the pressure of the well fluid in a region of the well to cause fluid entry from the formation into the well and wherein the logging instrument is thereafter passed through said region to conduct a log thereof which provides a logging signal indicative of regions of fluid entry into said well bore.

25. The method of claim 13 which is preceded by the preliminary step of reducing the pressure of the well fluid in a region of the well to cause fluid entry from the formation into the well and wherein the logging instrument is thereafter passed through said region to conduct a log thereof which provides a logging signal indicative of regions of fluid entry into said well bore.

26. The method of logging according to claim 19 wherein said instrument is passed through said bore hole containing fluid which provides substantially the same radiation response per unit volume throughout the region logged and the radiation measurement provides a measure of the quantity of well fluid from place to place whereby the log provides a caliper of the bore hole.

27. The method of claim 19 further including the additional step of repeating the logging method of claim 21 after a time interval during which fluid is likely to enter the bore hole from adjacent formations and comparing the logging records of said two logs to determine regions of fluid entry into said bore hole from the formations.

References Cited in the file of this patent
UNITED STATES PATENTS

| | | |
|---|---|---|
| 2,335,409 | Hare | Nov. 30, 1943 |
| 2,617,941 | Craggs | Nov. 11, 1952 |
| 2,710,925 | McKay | June 14, 1955 |
| 2,718,143 | Pankratz | Sept. 20, 1955 |
| 2,825,044 | Peterson | Feb. 25, 1958 |
| 2,971,091 | Ball | Feb. 7, 1961 |
| 2,971,094 | Tittle | Feb. 7, 1961 |
| 2,991,364 | Goodman | July 4, 1961 |
| 3,037,115 | De Witte | May 29, 1962 |